Figures 1, 2:
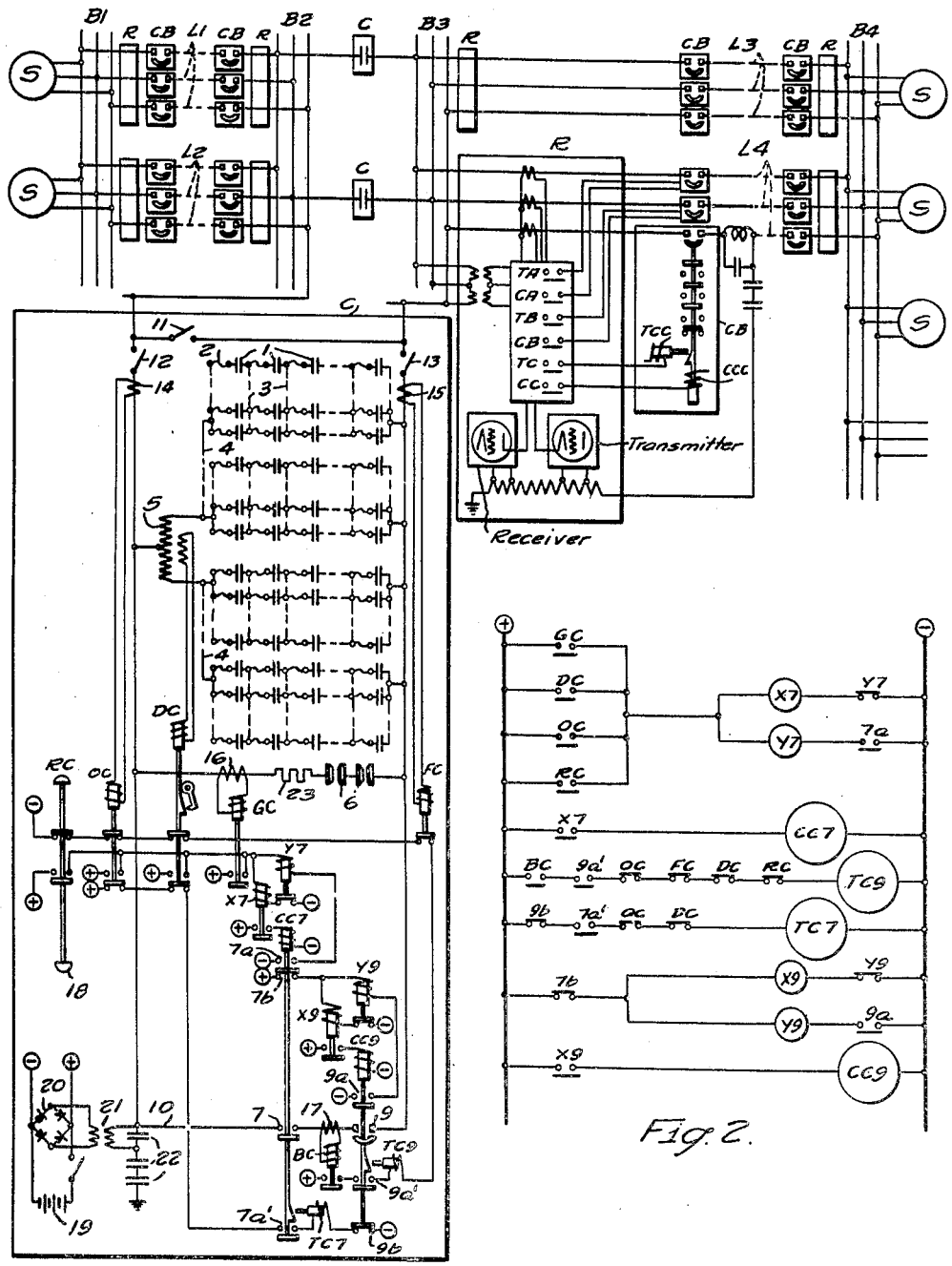

April 4, 1944.  R. D. EVANS ET AL  2,345,590

STABILITY WITH QUICKLY RESTORED PROTECTED SERIES CAPACITORS

Filed June 3, 1942  2 Sheets-Sheet 1

WITNESSES:

INVENTORS
Robert D. Evans, Ralph E. Marbury
and Alexander C. Monteith.
BY
ATTORNEY April 4, 1944.  R. D. EVANS ET AL  2,345,590
STABILITY WITH QUICKLY RESTORED PROTECTED SERIES CAPACITORS
Filed June 3, 1942  2 Sheets-Sheet 2

Compressed Air Tank

WITNESSES:
E. A. McCloskey
Dri. La Groome

INVENTORS
Robert D. Evans, Ralph E. Marbury
and Alexander C. Monteith.
BY O. B. Buchanan
ATTORNEY Patented Apr. 4, 1944

2,345,590

UNITED STATES PATENT OFFICE 2,345,590

STABILITY WITH QUICKLY RESTORED PROTECTED SERIES CAPACITORS

Robert D. Evans, Swissvale, and Ralph E. Marbury and Alexander C. Monteith, Wilkinsburg, Pa., assignors to Westinghouse Electric & Manufacturing Company, East Pittsburgh, Pa., a corporation of Pennsylvania Application June 3, 1942, Serial No. 445,562

20 Claims. (Cl. 172—237)

Our invention relates to electric power-transmitting lines, connecting synchronous machines in such manner that stability or power-limits are critical considerations in the operation of the system, and having quickly or immediately restored, protected, series capacitors for compensating for part of the line-reactance. Protected series capacitors have been known before, as a theoretical possibility, and they have been actually utilized in places where it was not necessary to quickly restore the capacitors to service after they had been shunted out by the protective equipment to prevent abnormal voltage-conditions on the capacitors as a result of fault-currents in the line. By "protected" series capacitors, we mean capacitors which are provided with shunting gaps or contact-making devices, or both, for limiting the amount of excessive voltage which can even momentarily appear across the capacitors, so that the rating of the capacitor is determined by the working-conditions rather than the fault-conditions.

Since the earliest years of alternating-current power-transmission, it has been known that the stability and power limits of the system depend upon the magnitude of the inductive line-reactance, by "line-reactance" meaning the total reactance between the internal voltage of the synchronous machine at the sending end and the internal voltage of the synchronous machine at the receiving end. It has also been known, for about the same length of time, that series capacitors, interposed in the line-conductors, would neutralize or compensate for as much as might be desired, of the line-reactance. So far as we know, no practical use has ever been made of unprotected high-voltage series capacitors, in a transmission system which is subject to short-circuit currents of three or more times the normal full-load current, for the reason that the cost of the capacitors increases on an exponential curve, in accordance with the amount of the current traversing the capacitors, and in accordance with the insulation-level built into the capacitor. In lines or systems where stability or power-limits are not involved, protected or gapped series capacitors can be useful in improving voltage-regulation, reducing the flickering of lights when heavy momentary loads come on the system, and for the like purposes.

In systems where stability is critical, there is a somewhat different problem, because we are now dealing with a system utilizing two or more lines or circuits in parallel, or utilizing a single line which is taken out of service for such a small number of cycles, in the event of an extinguishable line-to-ground fault, that stability is not lost. In these stability-limited systems, the limiting operating condition, so far as maintaining stability is concerned, is encountered during the transients following a switching-operation which is necessary to clear a fault, and hence, if series capacitors are to be utilized, for securing any assistance in maintaining stability in such a system, it is obvious that the series capacitors must be connected to the system during the stability-jeopardizing transient which follows the switching-operation which is necessary in order to clear a fault from the system. Heretofore, series capacitors have not been utilized for the purpose of improving the power-limits or the stability of a synchronous transmission system, for the reason that, if the capacitors are unprotected, their cost would be prohibitive (practically that of an additional circuit which could be added to the transmission line with better operating results), whereas if protected or gapped series capacitors were utilized, the capacitors would be out of service, by reason of their protective gap, at the very time when their presence was needed for the purpose of maintaining stability. Such was the first report on Power System Stability, published in February, 1937, by the A. I. E. E. E. Subcommittee on Interconnection and Stability Factors (pages 261–282).

It is an object of our invention to provide an economically practicable series-capacitor-means associated with each phase-conductor of an alternating-current power-transmitting line of such high reactance and voltage that the power-limits under the transient conditions following a switching-operation to clear a fault are a controlling consideration in the operation and use of the power-transmitting system, and to provide each phase-conductor series-capacitor-means with protective bypassing-means for not only quickly or immediately bypassing the series-capacitor-means in time to substantially prevent the maintenance of more than a predetermined amount of over-voltage thereon in the event of fault-current-flow in its phase, but for also quickly or immediately thereafter restoring the series-capacitor-means to service again, within a period of time which is sufficiently short to be of material assistance in maintaining stability, particularly the transient stability during the power-swings or surges following a fault-clearing circuit-breaker operation.

When the line-sectionalizing circuit-breakers, on a three-phase high-voltage transmission-line, are gang-operated to open-circuit all three phase-conductors of the line to clear a fault, the series capacitors should, in general, be restored into service within 12 cycles (on a 60-cycle line) after the incipience of the fault-current condition, if the synchronous machines at the two ends of the line are to be kept in step or synchronism with each other. Where single-pole tripping is utilized, the tolerable time-limit would be somewhat longer, probably of the order of about 16 cycles.

In all of these systems, if stability is to be maintained, it is well known, for the faulted line-section to be tripped out, or disconnected from the rest of the system, as soon as practicable, if stability, or synchronous operation, is to be maintained this disconnecting limit being something of the order of 8 or 10 cycles, or possibly longer, depending upon the constants of the transmission-system, and even quicker line-sectionalizing operations are usually resorted to, in most cases.

To afford some inkling as to the practical nature of the physical problem which is involved, in a typical case, although our invention is not limited to this particular case, it may be noted that our invention is being seriously considered, for application to a two-circuit, 230-kv., 230-mile, three-phase transmission-line having a line-conductor reactance of approximately 0.8 ohm per mile. We are contemplating enough series capacitance to provide either a 44% or a 60% compensation of the line-reactance, the capacitors being bunched, between two busses in approximately the middle of the line.

The 60% compensation would cost approximatly $1,250,000, plus about $250,000 more for its protective equipment, insulating structures and accessories, totalling about ¼ of the cost of a third line or circuit, and giving the two-circuit line about the same power-limits as a three-circuit line without the series capacitors.

The 44% compensation would cost about $600,000 for the capacitors, with an additional $150,000 for the capacitor-protecting equipment, totalling about ⅐ of the cost of the third line, and giving about a 40% increase in the power-limit with all four line-sections in service, and about a 50% increase in the stability-limit or power-limit during the critical time immediately after one of the four line-sections has been switched out, to clear a fault thereon—thus providing substantially the same margin of stability, with three identical generators at the sending end, and two lines or circuits, that would be obtained, without the series capacitors, with only two of the generators in service. The 44% compensation-plan would require 5460—15 kva. capacitors, each having its own fuse, and each insulated for 2400 volts. These capacitors would have to be mounted on special insulated platforms, to insulate them for the line-voltage, a separate capacitor-bank for each phase, and they would be arranged in 130 parallel paths, each containing 14 capacitors in series, providing a total capacitor-rating of 812 amperes at 33,500 volts, or 27,200 kva. per phase.

Each capacitor-bank, that is, the series-capacitor-means for each of the three phases, would have to be provided with suitable disconnecting-switches for bypassing or short-circuiting the capacitors and removing or isolating them from service, they would have to have suitable short-circuiting circuit-breakers capable of interrupting the entire line-current, even under fault-current conditions, so that the disconnecting switches could be operated, and they would have to have our special protective means which would restore the capacitors to service again, preferably within from 8 to 12 cycles after the incipience of the fault-current condition.

In speaking of the ratings of these series-capacitor units, we refer to the continuous rating thereof, in current and ohms, or the voltage which appears across the capacitor under continuous full-load line-current conditions. During fault-conditions, the maximum fault-current will amount to at least four or five times the full rated current, sometimes more, which would impose four or five times the rated votage, or more, as the case may be, on the series capacitors as long as such a current was flowing. The series capacitors cannot stand such an overvoltage, even momentarily. It has been ascertained, however, that a normally designed, or continuous-rating, capacitor can safely withstand twice its normal voltage or continuous-rating for something like a few cycles, and a crest value of three times the crest of its normal voltage for a transient condition of not more than a fraction of a cycle. Heretofore, the quickest completely operating bypassing protective-devices which have been utilized for high-voltage series capacitors have required from 20 to 30 cycles to restore the series-capacitors to service after the reduction of the line-current from fault-magnitude to normal-load magnitude, and many protective devices have required much longer times.

To bring down this capacitor-restoring time to the required 4 cycles, more or less, after the subsidence of the fault-current, or 8 to 12 cycles after the incipience of the fault-current (allowing 4 to 8 cycles for the line-sectionalizing circuit-breaker operation), we have had to devise special bypassing protective equipment, never before utilized with series capacitors, involving such special expedients as two circuit-breakers for bypassing a protective gap which is shunted around the series-capacitor-means in each phase-conductor, one of the protective circuit-breakers being a fast-closing contactor which is designed to be able to close its contacts in the fastest time possible, something like 1½ or 2 cycles, but incapable of opening its contacts under load, and the other protective circuit-breaker being designed to have a minimum tripping time. This two-breaker protective equipment could be designed with interlocks or safeguards to make sure that the fast-tripping breaker is not tripped until after the subsidence of the fault-current, or it could be designed to go through its cycle of operations within a predetermined time, which is chosen with respect to the known line-sectionalizing switching-times of the system in response to faults.

An alternative capacitor-protecting means which we have contemplated, for obtaining the necessary quick restoration-time of the series capacitors, involves a special air-blast means, operated by a relay, for restoring the capacitors to service by blowing out the arc in a protecting bypassing gap after the subsidence of the fault-current; or a special self-clearing gap-device might be utilized, which will clear its gap within 10 cycles, or less, after the subsidence of the fault-current conditions, without waiting for mechanical parts to move, but probably necessitating the maintenance of a vacuum-pump for making sure of the vacuum-conditions, besides other disadvantages; or a special single protective circuit-breaker might be designed, with the lightest possible moving parts, and the strongest possible operating-forces, for both closing its contacts in the quickest possible time, and opening its contacts in the quickest possible time, so as to obtain both quick closing and quick opening, in the same breaker, an operating-condition which is not obtained with sufficient speed in standard circuit-breakers.

Figure 3:
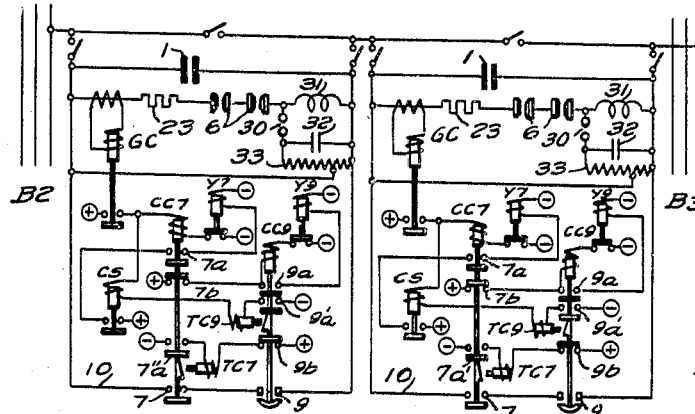
Figure 4:
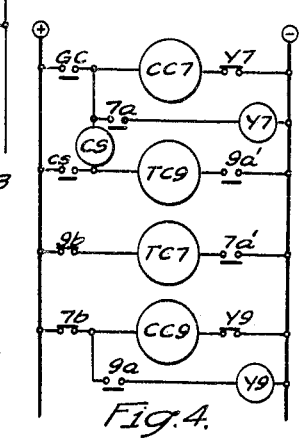
Figure 5:
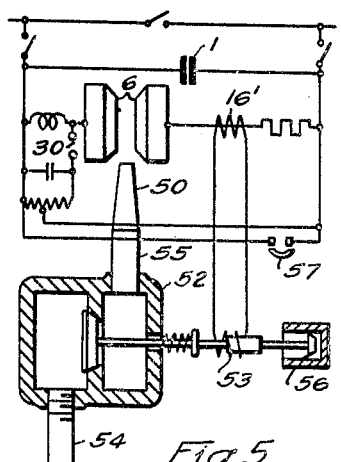
Figure 6:
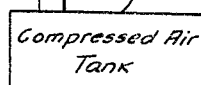
Figure 6:
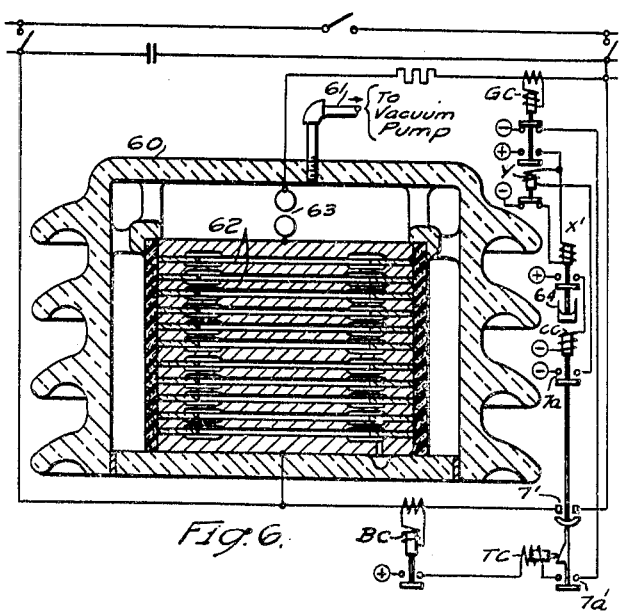
Figure 7:
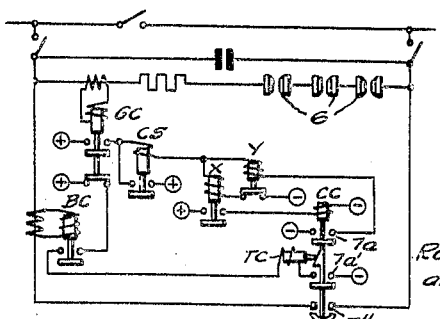

With the foregoing and other objects in view, our invention consists in the circuits, systems, methods and combinations, and in the broad and specific means which we have provided for accomplishing these purposes, as will be hereinafter described and claimed, and illustrated in the accompanying drawings, wherein:

Figure 1 is a diagrammatic view of the previously mentioned double-circuit 230-mile transmission-system with our invention applied, in an illustrative form of embodiment utilizing two protective breakers, in addition to the protective gap-circuit, for each of the three line-conductor capacitor-banks, Fig. 2 is a schematic diagram of the direct-current breaker-control circuits of the device shown in Fig. 1, Fig. 3 is a simplified wiring-diagram of a different form of control-equipment for the two protective breakers of Fig. 1, utilizing control-means which restore the bypassed capacitor to service within a predetermined time, without waiting to check for the subsidence of the fault-current condition, Fig. 4 is a schematic diagram of the circuit-breaker control-circuits for Fig. 3, Fig. 5 is a diagrammatic view of circuits and apparatus utilizing a compressed-air blast for extinguishing the arc in a shunting-gap which is connected across the series capacitors, Fig. 6 is a similar view utilizing a vacuum-type gap-device for protecting the series capacitors, with a delayed-control circuit-breaker for protecting the vacuum-gap device in the event that it should fail to clear itself within the time necessary to prevent the device from destruction, and Fig. 7 is a simplified diagrammatic view of circuits and apparatus for accomplishing the protection of the protective-gap circuit by means of a single circuit-breaker which is both fast-closing and fast-tripping in its operation.

The illustrative transmission-system which is shown in Fig. 1 represents a two-circuit high-voltage transmission-line extending between distant stations indicated by busses B1 and B4, with two intermediate busses B2 and B3 disposed at an intermediate station near the center of the line. Synchronous dynamo-electric machines, as indicated at S, are connected to the transmission system at both the sending and receiving ends. Two 3-phase line-sections L1 and L2 are connected between the busses B1 and B2, while two other 3-phase line-sections L3 and L4 are connected between the busses B3 and B4.

We have illustrated the use of single-pole switching-equipment for protecting the line-sections against faults, by quickly tripping out only the phase-conductors which are faulted, for certain predetermined types of fault, notably single-phase arcing-ground faults, the tripped single-pole breakers being quickly and automatically restored to service again, provided that the fault has extinguished itself in the meantime. Any suitable single-pole protective relaying system may be utilized for thus responding to faults on the individual line-conductors, a suitable system for this purpose, and probably the first successful system for this purpose, all things considered, being that which is shown in the Goldsborough application Serial No. 424,957, filed December 30, 1941, and assigned to the Westinghouse Electric & Manufacturing Company.

This single-pole fault-responsive system is indicated diagrammatically for the B3 end of the L4 line-section, and particularly for the phase-C line-conductor thereof, including a circuit-breaker equipment which is indicated by the rectangle CB, including a phase-C closing coil CCC, a phase-C tripping coil TCC, and various auxiliary-switch interlocks on the circuit breaker. The closing and tripping coils are controlled by a relaying equipment which is generically indicated by a rectangle R, and comprising a carrier-current transmitter and receiver, as indicated, and relays and control for providing separate trip-coil contacts and closing-coil contacts for the several line-phases A, B and C, as indicated at TA, CA, TB, CB, TC and CC. It will be understood that similar circuit-breaker and relaying equipment will be utilized for each end and each phase-conductor of all four of the line-sections L1, L2, L3 and L4, as indicated by the small rectangles or boxes marked CB and R, respectively.

In accordance with our invention, special series-capacitor equipment, one for each of the phases A, B and C, is provided, as indicated by the three capacitor-rectangles C connected between the corresponding phases of the two intermediate busses B2 and B3. As the capacitor-equipments for all three phases are similar, a detailed shown and description of the capacitor-equipment for only one phase will suffice for all.

While we have shown our series-capacitor equipment in a location and arrangement which we now believe to be preferable, all things considered, we wish it to be understood that we are not limited to this precise arrangement, particularly in the broader aspects of our invention. The essential thing is, that there shall be a suitably protected series-capacitor-means in series with each phase of the line, regardless of the particular location of the capacitor-units. We prefer the disposition of the capacitors in a lump or group near the center of the line, and between the two central busses B2 and B3, as distinguished from separate capacitor-equipment in each one of the four line-sections L1, L2, L3 and L4, because analysis shows that this is by far the most economical disposition of the capacitors, requiring the smallest amount of kva. capacity. We desire our Fig. 1 diagrammatic representation to be understood, however, in a more generic sense, as representing any number and arrangement of series capacitors, each protected by special protective equipment which will be shown and described in detail, one form of embodiment of a capacitor-unit with protective equipment being shown in the large rectangle marked C in Fig. 1, and alternative equipments being shown, in simplified form, in Figs. 3, 5, 6 and 7 of our drawings.

In the simplified alternative figures, Figs. 3, 5, 6 and 7, some of the details of the capacitor-equipment which is shown in the large rectangle C in Fig. 1 have been omitted, for the sake of clarity, but we desire it to be understood that the omitted features can be utilized in the other figures as well, and some or many of the omitted features probably would be so used. In each case, the series-capacitor-equipment represents equipment which is to be serially associated with one of the phase-conductors of the transmission line, and particularly a transmission-system of the type which is shown in Fig. 1, or of a type, in general, where a particular problem is involved in maintaining continuity of service with stability.

Referring to the large capacitor-rectangle C in Fig. 1, it will be noted that we have provided a large number of series-capacitor-units 1, each of which may represent a 15 kva., 2400 volt unit, or a unit of any other standard voltage and capacity-rating. Each unit is provided with its own fuse, as indicated at 2. In order that the individual fuses 2 may receive a current of at least five times the normal value, in the event of a short-circuit in its particular capacitor-unit, and not more than ten times the normal current, we have provided cross-ties 3 connecting the capacitor-units 1 in groups of five parallel-connected units. In the particular installation which is illustrated, there are 1820 capacitor-units 1 in each phase-group as indicated by the large rectangle C in Fig. 1, and these capacitors are connected in 130 parallel groups, each group consisting of 14 capacitors in series, the 130 parallel groups being subdivided into 26 separate groups of five parallel-connected capacitors, as indicated by the cross-ties 3, and the 26 separate groups being again subdivided into two groups of 13 each, as indicated by the two bussing-ties 4. The two bussing-ties 4 are connected by a current-dividing transformer 5 which is utilized to energize a latch-type differential-current relay DC, for responding to a condition of too many failures of the series-capacitor units 1, which are assumed to result in a predetermined amount of unbalance between the capacitor-currents which are supplied to the two bussing-ties 4, as described and claimed in a Marbury Patent 2,125,077, granted July 26, 1938.

The entire bank of the series capacitors 1, as shown in the large rectangle C in Fig. 1, is shunted by a protective gap 6 which may be either a single gap-device, or preferably, at the high capacitor-bank voltages which have been mentioned, it may consist of several gap devices in series, as indicated. It is preferable that the gap-device 6 shall be a low-impedance or low-voltage gap-device which has a low arcing-voltage, which hangs tenaciously onto the arc and restrikes promptly at each current-zero, and which has sufficient heat-resisting capacity to withstand the heavy current-flow therethrough for several cycles, without destruction. A suitable gap-device for this purpose is a carbon-electrode gap-device which has the property of sublimizing, rather than liquefying, in response to great heat, so that the gap is not ruined by the passage of heavy currents for a considerable number of cycles, such a gap being described and claimed in the Marbury et al. Patent 2,144,503, granted January 17, 1939.

In the particular form of embodiment of our invention, which is shown in the large rectangle C in Fig. 1, we utilize two circuit-breakers, which are distinguished by the numerals 7 and 9 which are applied to their main contacts, said contacts 7 and 9 being connected in series with each other, in a breaker-circuit 10 which bypasses both the gap-circuit 6 and the bank of series-capacitors 1. The circuit-breakers 7 and 9 are needed for two reasons, first of which is to extinguish the arc in the protective gap 6. Since the gap 6 is chosen for its low voltage, and the tenacity with which it will hang onto an arc, once the arc has been established, it is necessary to provide some external means for putting out the arc, and it is also quite desirable to quickly put out that arc, if possible, before the gap-electrodes get too hot, so that it will not take too long for the gap-means to cool off and to lose its ability to restrike the arc when again impressed with normal voltage-conditions. The bypassing breaker-circuit 10 thus quickly transfers the line-current from the gap 6 to itself, and we provide means for quickly thereafter opening the bypassing breaker-contact circuit 10.

A second reason why it is necessary to have a controllable bypassing circuit, such as our breaker-contact circuit 10, which can be opened and closed, at will, by suitable remote-control apparatus such as will be subsequently described, and which is capable of handling the full-load line-currents, and even the short-circuit currents of the line, is that it is necessary, in any practical series-capacitor installation, to provide means whereby the capacitor-bank may be taken out of service, when necessary, without putting the transmission-line out of service, and this necessitates, in any practical installation, the utilization of disconnect-switches such as are indicated at 11, 12 and 13, which can be manipulated to connect and disconnect the capacitor-bank, but which can only be operated under low-current conditions. Thus, the disconnect-switch 11 is utilized to bypass the entire capacitor-bank, while the disconnect-switches 12 and 13 are utilized to disconnect or isolate the capacitor-bank from the high-voltage transmission-system, so that it can be worked upon.

The circuit-breaker 7 which is utilized in Fig. 1 is preferably a quick-closing contactor, having a main contact 7 which can be closed very quickly when the closing-coil CC7 is energized, the main contact 7 being such, however, that it cannot be opened safely while carrying current, because suitable arc-interrupting means are not provided, thus enabling the contactor or circuit-breaker 7 to be built so as to have a very quick closing time. The circuit-breaker 7 is also provided with several auxiliary switches or contacts which are carried thereby, such as the two make-contacts 7a and 7a' which are open when the main breaker-contact 7 is open, and a back-contact 7b which is closed when the main-contact 7 is open. The circuit-breaker or contactor 7 is a latch-type device which latches itself closed, and is provided with a trip-coil TC7 for tripping or unlatching the device so as to cause the main contact 7 to move to its open position. The circuit-breaker 7 is also provided with auxiliary equipment including a closing-relay X7 and a cutoff-relay Y7.

The circuit-breaker 9 which we utilize in Fig. 1 is a quick-tripping circuit-breaker which is capable of opening its main contacts 9 under load, and quickly interrupting the circuit when its trip-coil TC9 is energized. The circuit-breaker 9 is also provided with a closing coil CC9, and with auxiliary make-contacts 9a and 9a', and an auxiliary back-contact 9b. The circuit-breaker 9 is also provided with auxiliary equipment including a closing-relay X9 and a cutoff-relay Y9.

In addition to the differential-current relay DC which is energized from the current-dividing transformer 5, we have shown, in Fig. 1, several other control-devices which we utilize in the control of our circuit-breakers 7 and 9. Thus, we show an overcurrent relay OC, which is energized from a current-transformer 14 in series with the disconnect-switch 12, a fault-current relay FC which is energized from a current-transformer 15 in series with the disconnect-switch 13, a gap-current relay GC which is energized from a current-transformer 16 in series with the main gap-device 6, a breaker-current relay BC which is energized from a current-transformer 17 in the breaker-contact circuit 10, and a remote-control device RC which is illustrated as comprising a two-position switch which is controlled by a remote-control means such as a long handle 18 or any equivalent means for controlling the operation or position of the remote-control device RC at the will of an operator.

A source of direct-current power, as indicated by the plus and minus signs in Fig. 1, is provided for controlling the two circuit-breakers 7 and 9, and is illustrated as comprising a battery 19 which is trickle-charged through a rectifier-bridge 20 from a small potential transformer 21 which is energized across the top unit of a grounded capacitor-string 22 or other source.

The direct-current connections of the various control-devices, and the operation of the capacitor-equipment which is shown in the large rectangle C in Fig. 1, will both be described together, as follows, it being noted that the direct-current connections are also schematically indicated in Fig. 2. The contactor or breaker 7 is normally open, and the breaker 9 is normally closed. When a fault occurs on the transmission system, on the phase in which any particular capacitor-equipment is connected, the line-current, which flows through the capacitors, is increased, and the maximum peak-value of this fault-current is usually more than three times the peak-value of the normal rated line-current. As the line-current increases toward this high value, the voltage which appears across the capacitor-bank 1 increases correspondingly. At a certain predetermined overvoltage for which the gap 6 is set, which may be 2½ or 3 times the rated capacitor-voltage, more or less, the gap 6 breaks down and becomes a low-impedance conductor which bypasses, and practically short-circuits, the series-capacitor bank 1. This transfers the fault-current from the series capacitors 1 to the bypassing gap-circuit, and this operation is performed automatically and quickly, so as to substantially prevent the maintenance of more than a predetermined amount of overvoltage on the series-capacitor bank.

It is usually desirable to provide a certain amount of impedance in the gap-circuit for somewhat limiting the discharge-current which is delivered by the enormous capacitor-bank during the first few micro-seconds of its discharge, and also for dissipating the energy thereof so as to dampen the resulting oscillations, and to this end, we have illustrated a heavy-current resistor 23 of small ohmic value in series with the gap-device 6. This resistor 23, or other discharge-current-limiting impedance, is not large enough to make the gap-circuit have a high impedance, or to make the overall voltage of the gap-circuit anything like as large as the rated voltage of the series-capacitor bank 1, even when the heaviest fault-currents are flowing through the phase-conductor of the transmission-line.

As soon as the line-current is transferred to the gap-circuit, the gap-current relay GC is energized, picking up its make-contact, which is sufficiently indicated by the relay-designation GC, thus energizing the operating coil of the closing-relay X7, the circuit of which is completed through the back-contact of the cutoff-relay Y7. The closing-relay X7 picks up its contact and energizes the closing-coil CC7 of the contactor or circuit-breaker 7, thus quickly closing the breaker. The breaker or contactor 7 thus closes its auxiliary make-contact 7a, which energizes the cutoff-relay Y7 which opens its back-contact in circuit with the closing-relay X7, thus interrupting the current-flow through the closing-coil CC7. The contactor 7 thus picks up and closes its main contact 7 in a time which may be of the order of 1½ cycles. This completes the breaker-contact bypassing-circuit 10, thus transferring the line-current again, this time removing the line-current from the gap-device 6 and transferring it to the breaker-circuit 10, which has an even lower impedance than the gap-circuit. The arc in the gap-device 6 is instantly extinguished, thus permitting the gap-device to cool and to deionize its arcing-space so that the arc will not restrike when the breaker-circuit 10 is next reopened, as will now be described.

As soon as the line-current begins to flow through the bypassing breaker-contact circuit 10, in Fig. 1, the breaker-circuit relay BC picks up, and thus partially completes a circuit for the trip-coil TC9 of the second breaker 9. However, the tripping circuit of the second breaker 9 also includes the back-contacts of the four relays FC, DC, OC and RC, and of these four relays the fault-current relay FC and the overcurrent relay OC will both be energized, in response to the excessive line-current which is flowing at the moment, or until the fault on the transmission system has been cleared by the opening of one of the sectionalizing circuit breakers CB, through the operation of one or more of the relaying equipments R, as indicated more in detail in connection with the line-section L4 in Fig. 1. Until the fault is cleared from the system, the two relays FC and OC will remtain energized, and as soon as the fault-current ceases, these relays will quickly return to their normal unenergized positions, closing their back-contacts, and completing the circuit of the trip-coil TC9 for the normally closed circuit-breaker 9, thus tripping out said circuit-breaker in a short time, which may be something of the order of four cycles, or even less, if it is feasible to make the time shorter. The trip-circuit just mentioned also includes the auxiliary make-contact 9a' of the circuit-breaker, which opens when the breaker opens, and thus deenergizes the trip-coil circuit.

The opening-operation of the circuit breaker 9 removes the short-circuiting circuit from around the series-capacitor bank 1 and restores the series-capacitors to service again, in a time which is within four cycles after the subsidence of the fault-current, or within 8 to 12 cycles after the incipience of the fault-current, assuming that the first 4 to 8 cycles are consumed in securing the initial fault-responsive line-sectionalizing opening-operation of one or more of the circuit-breakers CB on the line.

As soon as the circuit-breaker 9 opens, in Fig. 1, its back-contact 9b closes and energizes the trip-coil TC7 of the contactor 7, the tripping-circuit of which is completed through the back-contacts DC, OC and RC. The contactor 7 thus opens, thus momentarily putting the breaker-circuit 10 in a doubly-open condition with both of the contacts 7 and 9 open, but as soon as the contactor 7 opens, its back-contact 7b closes and immediately energizes the closing-relay X9 of the circuit-breaker 9 in the manner which has already been described in connection with the circuit-breaker or contactor 7, thus finally restoring the capacitor-protecting apparatus to its initial condition.

If the line-current should rise to a value which is not sufficient to break down the gap 6, but would be sufficient to damage the capacitor, by producing a relatively small overvoltage-condition therein and thermally overloading the capacitor, if such current should be permitted to flow for any considerable length of time, the overvoltage relay OC will operate to pick up its make-contacts and initiate an operation of the capacitor-protecting circuit-breakers by energizing the closing-relay X7 of the breaker or contactor 7, and thus switching the capacitor-bank 1 out of service as long as such overcurrent condition persists on the line, the series-capacitor bank being locked out of service by reason of the open back-contact of the OC relay, in series with the tripping-coil TC9 of the normally closed breaker 9.

In case a sufficient number of the individual capacitor-units 1 should fail and become internally short-circuited, the resulting unbalanced condition of the capacitor-current, in the two halves of the capacitor-bank 1, would result in an operation of the differential-current relay DC, which would latch itself in its actuated position until manually restored. The make-contact of the DC relay would initiate the closing-operation of the normally open contactor 7, and the top back-contact of this DC relay would open the tripping circuit of the normally closed circuit-breaker 9, thus preventing the restoration of the series-capacitor bank 1 into service until the differential-current relay DC has been manually reset.

The fault-current relay FC is designed to respond only to exceptionally high line-currents of fault-magnitude, serving, when it responds, as an additional safeguard or check against the tripping of the normally closed breaker 9.

Provision is made for servicing the series-capacitor equipment, for maintenance-purposes, by manually removing the series-capacitor bank 1 from service, which is accomplished by actuating the remote-control switch RC, the make-contact of which brings about the closing of the normally open contactor 7, while the RC back-contact prevents the tripping of the normally closed breaker 9. It is then possible to close the bypassing disconnect-switch 11, after which the segregating disconnect-switches 12 and 13 may be opened, thus completely taking the series-capacitor equipment out of service, so that it can be handled for any necessary maintenance operations.

In Fig. 3, we have shown, in simplified diagrammatic form, the principles underlying three variations in the series-capacitor equipment which is shown in the large rectangle C in Fig. 1.

One of these three variations consists in the employment of a plurality of standard voltage capacitor-protecting equipments, connected in series with each other in sufficient numbers to make up the required overall capacitor-voltage at the full-load line-current. This obviates the necessity for designing special equipment for every special voltage-rating which may be required of the series-capacitor equipment in each line to which it is applied.

Another special feature which is introduced in Fig. 3, as compared to Fig. 1, is the provision of capacitor-protecting control-equipment which carries through a predetermined cycle of breaker-operation, in response to an arc-over of the gap-device 6, without waiting to make sure that the fault has been cleared from the phase-conductor of the transmission-line before the normally closed breaker 9 is tripped, thus restoring the series-capacitor unit 1 to service. Thus, in Fig. 3, the gap-current relay GC directly energizes the closing coil CC7 of the normally open contactor 7, and at the same time, it simultaneously energizes the trip-coil TC9 of the normally closed breaker 9. The contactor 7 is designed to close very quickly, within 1½ cycles or less, but, in Fig. 3, the breaker 9 is so selected, or designed, that it has a tripping-time of the desired order of magnitude, such as a 12-cycle tripping-time.

Thus, instead of waiting, as in Fig. 1, to be sure that the line-current has subsided to normal magnitudes, waiting until an overcurrent relay can drop out in response to the reduction in the value of the line-current, before we even begin to trip out the normally closed breaker 9, and then resorting to an expensive fast-tripping breaker in order to make up for the wasted time, our Fig. 3 system utilizes a more conventional breaker 9, which can be less expensively designed, to require the full 12 cycles to interrupt the arc across its main contact 7, when interrupting currents of the expected fault-magnitude, thus interrupting the breaker-contact bypassing-circuit 10 within the necessary time-limit for maintaining stability, without necessitating such a special, fast-tripping breaker 9 as in Fig. 1. Or the opening-time of the breaker 9 in Fig. 3 may be chosen for 8 cycles, instead of 12, or any other time, which would usually be chosen with reference to the normally expectable fault-clearing time of the protective equipment CB and R on the transmission-line.

If the Fig. 3 breaker-opening or capacitor-restoring operation should happen to occur before the completion of the fault-clearing operation of the protective equipment CB and R on the transmission-system (referring to the fault-clearing equipment shown in Fig. 1), the capacitor-protecting gap 6 would flash over again, starting a new cycle of operation of the protective breakers 7 and 9.

In Fig. 3, when the breaker 9 trips open, its back-contact 9b directly energizes the trip coil TC7 of the contactor 7, causing the latter to open also, and when this happens, the back-contact 7b of the contactor 7 directly energizes the closing coil CC9 of the breaker 9, thus restoring the equipment to its initial position. The control-circuits for the circuit-breakers 7 and 9 in Fig. 3 are schematically indicated in Fig. 4.

In Fig. 3, we have also shown a contactor-switch CS, such as would normally be utilized for bypassing the GC contacts which initiate a cycle of breaker-operation, so as to take over the heavy current-carrying duty from the lighter contacts of the GC relay. The operating-coil of the contactor-switch CS is illustrated as being connected in series with the trip-coil TC9 of the normally closed breaker 9.

A third alternative method of construction or design, which is illustrated in Fig. 3, is the use of a pilot-gap or tripping-gap 30 for controlling and initiating the breakdown of the main gap-device 6, in a manner which is described and claimed in a Marbury Patent 2,072,717, granted March 2, 1937. In this pilot-gap device, an air-core inductance 31 of, say 100 microhenries, is included in the capacitor-bypassing circuit in which the main protective gap 6 is located, and this small air-core inductance 31 is bypassed by means of a circuit consisting of the pilot-gap 30 and a small capacitor 32. The small capacitor 32 is charged from the high-voltage terminals of an auto-transformer 33, the low-voltage terminals of which are energized across the terminals of the series-capacitor 1. The auto-transformer 33 imposes, on the pilot-gap 30, a voltage which is two or three times higher than the voltage appearing across the series-capacitor unit 1, and the pilot-gap 30 may be accurately calibrated or adjusted for small-current operation, to break down at any desired overvoltage across the main capacitor-unit 1.

When the pilot-gap 30 flashes over, in Fig. 3, it sets up a train of oscillations which start out with the voltage appearing across the high-voltage terminals of the auto-transformer 33, thus impressing, upon the main gap 6, a voltage of sufficient magnitude to safely insure its breakdown, regardless of the condition of its arcing surfaces, thus permitting the use of larger gap-settings in the main gap-device 6, and avoiding the necessity for an accurate adjustment of its breakdown-voltage. At the same time, the small inductance 31 of 100 microhenries, in series with the power-gap 6, offers no noticeable impedance to the flow of the 60-cycle current through the power-gap, although it may constitute a sufficient surge-discharge-limiting impedance to take over some or all of the duty of the gap-circuit resistor 23. We desire it to be understood that this discharge-initiating pilot-gap-means may be utilized in Fig. 1, or in any of the main-gap circuits utilizing our invention.

In Fig. 3, various features and safeguards of the main capacitor-bank 1 have been omitted, for convenience in illustration, but we desire it to be understood that the symbolically indicated capacitor 1, in Fig. 3, is, or may be, the same as the more specifically illustrated capacitor-bank consisting of a large number of series-parallel-connected capacitor-units 1, as shown in Fig. 1.

In Fig. 5, we have illustrated a form of embodiment of our invention in which we do not rely upon circuit-breaker operation to extinguish the arc in the main gap-device 6, or to restore the main capacitor-bank into service. In Fig. 5, we utilize a heavy-duty carbon-electrode power-gap 6, triggered by a pilot-gap 30, for bypassing the main capacitor-bank 1 in response to a predetermined overvoltage-condition on the main capacity-bank, that is, in response to a predetermined increase in the line-current, but we let this main carbon-electrode gap-device 6 carry the line-current for the full time that the main capacitor bank 1 is to be shorted out of service, instead of temporarily transferring the line-current from the gap-device to a breaker circuit 10, as in Figs. 1 and 3.

When the time comes to restore the series-capacitor 1 to service, say after the expiration of 8 or 12 cycles after the incipience of the fault-current condition, we extinguish the arc in the main power-gap 6 in Fig. 5, by blowing a strong blast of air across its arcing space, in a manner which constitutes the subject-matter of an application of L. R. Ludwig and C. V. Fields, Serial No. 437,636, filed April 4, 1942, assigned to the Westinghouse Electric and Manufacturing Company.

The air-blast means, in Fig. 5, comprises a nozzle 50, which receives air from a compressed-air tank 51, under the control of a normally closed valve 52 which is electrically operated by means of a solenoid 53 which is illustrated as being energized from the gap-current, as by means of the gap-circuit current-transformer 16'. If the compressed-air tank 51 is not too far away from the power-gap 6, and if the piping 54—55 from the tank to the nozzle 50 is fairly straight, it will be possible to get the valve 52 open, and the compressed air up through the piping to the nozzle 50, and out across the arcing-surfaces of the gap-device 6 within 5 to 8 cycles, or even less, after the beginning of current-flow in the gap-circuit, and this inherent time-delay in the bringing of the air-blast into play across the arcing-terminals of the gap-device 6 may be relied upon as the sole means for predetermining the length of time during which the arc will be permitted to play across the power-gap device 6. If desired, however, the operating-time can be adjusted to any desired value by means of any of the many known time-controlling means which are available, as symbolically indicated by a dashpot 56 in Fig. 5.

In the operation of the device shown in Fig. 5, the series-capacitor bank 1 remains shorted out of service as long as the main arc-device 6 is arcing, and this time is controlled by the time required to get the air-blast across the arcing-surfaces, and extinguish the arc, in response to the electric solenoid-valve 53—52, which responds to the initiation of the gap-current-flow.

The carbon-electrode gap-device 6 has such a low arcing-voltage, and such a low recovery-voltage, that it not only constitutes practically a short-circuit on the by-passed capacitor-bank 1, while the arc is in operation, but the arc restrikes very promptly after each current-zero, so that the gap-device 6 maintains a low-impedance bypassing path which is effective during practically all of several successive half-cycles of the line-current, in fact, for some 10 or 16 or 24 half-cycles of the line-current, or until the expiration of any other predetermined time within which it is desired that the series-capacitor bank 1 should be temporarily cut out of service and then restored into service again.

The predetermined time-limit within which the series-capacitor bank 1 is to be restored into service, after having been short-circuited in response to an overcurrent or over-voltage condition, either in Fig. 5, or in any other figure of our drawings, would preferably be, in general, a time longer than the maximum time required to clear a fault on the transmission-line in which the capacitor is connected, insofar as our present analysis of the problems has gone, but we contemplate that there may be instances, as previously intimated, in which it may be desirable for this predetermined capacitor-restoring time to be either occasionally, or even always, quicker than the time needed to clear the fault from the transmission-line, in which case there may be two or more operations of the power-gap 6 which protects the series-capacitors 1, before the fault-current is finally cleared from the transmission line.

In accordance with our present understanding of the requirements, however, it would not be suitable to substantially interrupt the capacitor-bypassing protective-circuit at the end of each half-cycle, or at each current-zero, with a gap-device which would require the building up of a high recovery-voltage before it would break down again and arc-over after each current-zero, as we believe that such a procedure would interpose objectionably high and harmful transients on the transmission-system. We believe that it is quite important for a low-impedance bypassing path to be maintained, which is effective during at least a few successive half-cycles, and during practically all of said successive half-cycles, that is, that the restriking-voltage, or recovery-voltage after a current-zero, should be low, in any protective gap-device 6 utilized in accordance with our invention, and that the bypassing current should be maintained for several successive half-cycles, either flowing through the gap-device itself, during all of this time, as in Fig. 5, or being transferred to a parallel-connected breaker-circuit 10, as has been described in connection with Figs. 1 and 3.

In Fig. 5, we have diagrammatically indicated a bypassing circuit-breaker 57, which is normally open, and which could be closed manually or otherwise, in the event of a defect in the apparatus or in the event of the necessity for performing a service or maintenance operation on the equipment.

In Fig. 6 we have shown a form of embodiment of our invention which utilizes, instead of the air-blast-controlled carbon-electrode power-arc device 6 of Fig. 5, a vacuum-type (or low-pressure) tripping-device 60, or any equivalent gap-device which is inherently capable of extinguishing itself within a brief time, say 10 cycles, more or less, after the subsidence of the line-current from fault-magnitude to normal power-current values. The particular form of vacuum-type gap-device 60 which is illustrated in Fig. 6 is an adaptation of the type of device which is shown in a Slepian et al. application, Serial No. 358,634, filed September 27, 1940, and assigned to the Westinghouse Electric & Manufacturing Company, with adjustments and refinements to make it operate within the time-limits required for the maintenance of stability, in the manner which we have previously explained in the foregoing discussion.

The vacuum-type gap-device 60, to be practicable or usable, in our invention, would have to have a reliably maintained vacuum, or predetermined low pressure, which we have indicated by means of a vacuum-pump connection 61, and it would have to be designed and built so as to operate within the particular time-limitations and voltage-limitations required of our invention. It may consist of a plurality of serially connected main gap-devices 62, and an insulating gap device 63, all enclosed in an evacuated housing 68, and it would have to be so finely adjusted or designed that it would reliably break down (either by itself or by a trigger-gap arrangement as previously described), with sufficient quickness, in response to an overvoltage of 200 or 300%, and would automatically cut off the current-flow therethrough sufficiently quickly after the restoration of the line-current to its 100% or normal value, maintaining this operation, without harm, while carrying not only the full short-circuit current of the line-conductor in which the series-capacitor equipment is connected, but also carrying the necessary discharge-currents of the enormous electrostatic capacity of the series-capacitor bank across which it is connected. While such a vacuum-type gap-device 60 has not yet been made, answering all of these requirements, we have illustrated it as a possibility which we believe to be capable of accomplishment, if a deliberate effort were made, by the designer, to meet all of the design-conditions which we have outlined as being requisite to our particular stability-improving problem, in connection with synchronous power-transmission systems.

In Fig. 6, we have illustrated a bypassing circuit-breaker 7', which we would recommend be included, in shunt-circuit relation to the vacuum-type gap-device 60, for the purpose of preventing destruction of the main gap-device 60 in the event that it should fail to interrupt its current-discharge upon the restoration of normal line-current conditions, this interruption of the gap-discharge being, in our estimation, an exceedingly difficult design-limitation which might sorely tax the ability of the designer of the vacuum-gap equipment.

In Fig. 6, we utilize the gap-current relay GC to energize a time-delayed closing relay X', after a time-delay of some 12 or 16 or more cycles, as determined by the setting of a dashpot 64 or other timing device, so that this relay will be called into operation only as a sort of back-up protective measure to be operated in the event of a failure of the expected operation of the vacuum-type gap-device 60. When the time-delayed closing-relay X' picks up, it energizes the closing-coil CC of the breaker 7', so that the breaker-contact 7' closes and establishes a bypassing circuit around the vacuum-type gap-device 60, thus extinguishing the arcing of the gap-device by short-circuiting its terminals. As soon as the current is thus transferred to the main breaker-contact 7', the breaker-current relay BC picks up, and establishes a tripping-circuit through the trip-coil TC of the breaker 7', the tripping-circuit being completed through the auxiliary breaker-switch 7a' and a back contact on the gap-current relay GC. The current through the closing-coil CC is interrupted by means of the cut-off-relay Y, similar to the cutoff-relay Y7 of Fig. 1.

In Fig. 7, we have illustrated a still further modification of our invention, in which a single circuit-breaker 7" is utilized in place of the two breakers 7 and 9 in Fig. 1 or Fig. 3. In this case, the single breaker 7" would have to be of a very special design, perhaps more special than any breaker which has been made heretofore, in that it would have to be able to handle the maximum fault-current of the transmission-line, on which would be superimposed the discharge-currents of the capacitor-bank, and it would have to not only complete its opening operation in the quickest possible time, but also complete its closing-operation in the quickest possible time, while maintaining adequate current-interrupting and current-carrying ability. Heretofore, circuit breakers have been made which are either fast-opening or fast-closing, but the special breaker 7" of our Fig. 7 would have to have the lightest possible moving parts, with strongest possible operating forces, in an effort to meet the very exacting time-limitations which we have heretofore outlined as being necessary for the accomplishment of our purposes.

The control-operation of the special circuit-breaker 7" in Fig. 7 is similar to the control-operation which has just been outlined for the conventional circuit-breaker 7' in Fig. 6, except that the closing-relay X, in Fig. 7, is an instantaneously operating relay, without the dashpot 64 of Fig. 6, and a contactor-switch CS has been added, as would probably be used in any actual breaker-controlling circuit, for bypassing the make-contacts of the GC relay which initiates the operation. In the operation of Fig. 7, therefore, the breaking down of the main gap 6 causes a picking up of the gap-current relay GC, which instantly energizes the closing-relay X, and through it the closing-coil CC of the special breaker 7", closing the latter in some four cycles, or within, say 4 to 8 cycles, after which the breaker-current relay BC energizes the trip-coil TC of the special breaker 1'', through the GC back-contact and the 1a' auxiliary switch, causing the special breaker 1'' to reopen its contacts within, say, another four cycles, or 4 to 8 cycles.

While we have illustrated our invention, and described its operating-principles, in connection with several different alternative forms of embodiment, and in accordance with our present understanding and appreciation of the multitude of problems which are connected with such a new and important development and innovation in the art of major-transmission-line-design, we wish it to be understood that the general principles of our invention, or some of them, are susceptible of design and embodiment in a number of different manners, other than the particular designs which have been illustrated and described. We desire, therefore, that our appended claims shall be accorded the broadest construction permitted by their language.

We claim as our invention:

1. A synchronous polyphase power-transmitting system of such high reactance and voltage that the power-limits of the system are a controlling consideration in the operation and use thereof, characterized by having electrostatic capacitors connected in series with the several phase-conductors of the transmission line, in combination with means responsive to fault-current conditions for immediately short-circuiting the capacitors and for quickly thereafter restoring the capacitors to service again within a period of time sufficiently short to be of material assistance in maintaining stability.

2. A multi-circuit synchronous polyphase power-transmitting system of such high reactance and voltage that the power-limits of the system are a controlling consideration in the operation and use thereof, characterized by having polyphase line-bussing means for interconnecting a plurality of circuits of the transmission line at an intermediate point thereof, electrostatic capacitors connected in series with the several phase-conductors of the line, in combination with means responsive to fault-current conditions for immediately short-circuiting the capacitors and immediately switching out the faulted portion of the line, and means immediately operating thereafter for removing the short-circuits from the capacitors.

3. A multi-circuit synchronous polyphase power-transmitting system of such high reactance and voltage that the power-limits of the system are a controlling consideration in the operation and use thereof, characterized by having two polyphase line-bussing means for interconnecting a plurality of circuits of the transmission line at an intermediate point thereof, electrostatic capacitors connected in series with the several phase-conductors of the line, between said two intermediate line-bussing means, in combination with means responsive to fault-current conditions for immediately short-circuiting the capacitors and immediately switching out the faulted portion of the line, and means immediately operating thereafter for removing the short-circuits from the capacitors.

4. A synchronous polyphase power-transmitting system of such high reactance and voltage that the power-limits of the system are a controlling consideration in the operation and use thereof, characterized by having electrostatic capacitors connected in series with the several phase-conductors of the transmission line, in combination with means responsive to fault-current conditions for immediately short-circuiting the capacitors and immediately switching out the faulted portion of the line, and means immediately operating thereafter for removing the short-circuits from the capacitors and for immediately restoring the cutout line-portion to service.

5. The invention as defined in claim 1, characterized by said capacitors neutralizing less than all of the reactance that determines the power-limits of the line.

6. The invention as defined in claim 2, characterized by said capacitors neutralizing less than all of the reactance that determines the power-limits of the line.

7. The invention as defined in claim 3, characterized by said capacitors neutralizing less than all of the reactance that determines the power-limits of the line.

8. The invention as defined in claim 4, characterized by said capacitors neutralizing less than all of the reactance that determines the power-limits of the line.

9. A synchronous power-transmitting system of a type in which continuity of service is maintained with stability, including fault-clearing means for disconnecting a faulted portion from the rest of the system within less than ten cycles after the occurrence of a fault, for most faults; series-capacitor-means in series with each phase of the transmission line; and means for quickly bypassing each series-capacitor-means, in response to fault-current in its phase, in time to substantially prevent the maintenance of more than a predetermined amount of overvoltage on the series-capacitor-means, said bypassing-means being further characterized by the ability to automatically restore the bypassed series-capacitor-means to service within less than sixteen cycles after the incipience of the fault-current condition, for most faults.

10. A synchronous power-transmitting system of a type in which continuity of service is maintained with stability, including fault-clearing means for disconnecting a faulted portion from the rest of the system within less than ten cycles after the occurrence of a fault, for most faults; series-capacitor-means in series with each phase of the transmission line; and bypassing-means, including a shunt-connected gap-device, for quickly bypassing and quickly restoring to service each series-capacitor-means, in response to fault-current in its phase, the total time within which the series-capacitor-means is restored to service by the substantial removal of the bypassing-circuit being less than sixteen cycles after the incipience of the fault-current condition, for most faults.

11. A multi-circuit synchronous power-transmitting system of such high reactance and voltage that the power-limits of the system are a controlling consideration in the operation and use thereof, characterized by having service-maintaining means including fault-clearing means for disconnecting a faulted portion from the rest of the system within less than ten cycles after the occurrence of a fault, for most faults; and stability-increasing means including series-capacitor-means in series with each phase of each circuit of the transmission-line, and means for quickly bypassing each series-capacitor-means, in response to fault-current in its phase, in time to substantially prevent the maintenance of more than a predetermined amount of overvoltage on the series-capacitor-means, said bypassing-means being further characterized by the ability to automatically restore the bypassed series-capacitor-means to service within less than sixteen cycles after the incipience of the fault-current condition, for most faults.

12. A multi-circuit synchronous power-transmitting system of such high reactance and voltage that the power-limits of the system are a controlling consideration in the operation and use thereof, characterized by having service-maintaining means including fault-clearing means for disconnecting a faulted portion from the rest of the system within less than ten cycles after the occurrence of a fault, for most faults; and stability-increasing means including series-capacitor-means in series with each phase of each circuit of the transmission-line, and bypassing-means, including a shunt-connected gap-device, for quickly bypassing and quickly restoring to service each series-capacitor-means, in response to fault-current in its phase, the total time within which the series-capacitor-means is restored to service by the substantial removal of the bypassing-circuit being less than sixteen cycles after the incipience of the fault-current condition, for most faults.

13. A polyphase synchronous power-transmitting system of such high reactance and voltage that the power-limits of the system are a controlling consideration in the operation and use thereof, characterized by having service-maintaining means including a separate phase-conductor means associated with each of the several phase-conductors of the transmission-line for quickly individually open-circuiting, and quickly individually restoring to service, a faulted line-conductor in response to a predetermined type of fault thereon; and stability-increasing means including a separate series-capacitor means in series with each of the several phase-conductors, and means for quickly bypassing each series-capacitor-means, in response to fault-current in its phase, in time to substantially prevent the maintenance of more than a predetermined amount of overvoltage on the series-capacitor-means, said bypassing-means being further characterized by the ability to automatically restore the bypassed series-capacitor-means to service within less than sixteen cycles after the incipience of the fault-current condition, for most faults.

14. A polyphase synchronous power-transmitting system of such high reactance and voltage that the power-limits of the system are a controlling consideration in the operation and use thereof, characterized by having service-maintaining means including a separate phase-conductor means associated with each of the several phase-conductors of the transmission-line for quickly individually open-circuiting, and quickly individually restoring to service, a faulted line-conductor in response to a predetermined type of fault thereon; and stability-increasing means including a separate series-capacitor means in series with each of the several phase-conductors, and bypassing-means, including a shunt-connected gap-device, for quickly bypassing and quickly restoring to service such series-capacitor-means, in response to fault-current in its phase, the total time within which the series-capacitor-means is restored to service by the substantial removal of the bypassing circuit being less than sixteen cycles after the incipience of the fault-current condition, for most faults.

15. The invention as defined in claim 9, characterized by the fault-clearing means operating to disconnect a faulted portion within less than eight cycles after the occurrence of a fault, for most faults; and the bypassing-means operating to maintain a low-impedance bypassing path which is effective during practically all of several successive half-cycles, and also operating to restore a bypassed series-capacitor-means to service within less than twelve cycles after the incipience of the fault-current condition, for most faults.

16. The invention as defined in claim 10, characterized by the fault-clearing means operating to disconnect a faulted portion within less than eight cycles after the occurrence of a fault, for most faults; and the bypassing-means operating to maintain a low-impedance bypassing path which is effective during practically all of several successive half-cycles, and also operating to restore a bypassed series-capacitor-means to service within less than twelve cycles after the incipience of the fault-current condition, for most faults.

17. The invention as defined in claim 11, characterized by the fault-clearing means operating to disconnect a faulted portion within less than eight cycles after the occurrence of a fault, for most faults; and the bypassing-means operating to maintain a low-impedance bypassing path which is effective during practically all of several successive half-cycles, and also operating to restore a bypassed series-capacitor-means to service within less than twelve cycles after the incipience of the fault-current condition, for most faults.

18. The invention as defined in claim 12, characterized by the fault-clearing means operating to disconnect a faulted portion within less than eight cycles after the occurrence of a fault, for most faults; and the bypassing-means operating to maintain a low-impedance bypassing path which is effective during practically all of several successive half-cycles, and also operating to restore a bypassed series-capacitor-means to service within less than twelve cycles after the incipience of the fault-current condition, for most faults.

19. The invention as defined in claim 13, characterized by the bypassing-means operating to maintain a low-impedance bypassing path which is effective during practically all of several successive half-cycles, and also operating to restore a bypassed series-capacitor-means to service within less than twelve cycles after the incipience of the fault-current conditions, for most faults.

20. The invention as defined in claim 14, characterized by the bypassing-means operating to maintain a low-impedance bypassing path which is effective during practically all of several successive half-cycles, and also operating to restore a bypassed series-capacitor-means to service within less than twelve cycles after the incipience of the fault-current condition, for most faults.

ROBERT D. EVANS.
ALEXANDER C. MONTEITH.
RALPH E. MARBURY.